United States Patent
Choy et al.

(10) Patent No.: US 11,550,854 B2
(45) Date of Patent: Jan. 10, 2023

(54) DYNAMIC DELIVERY OF MODIFIED USER INTERACTION ELECTRONIC DOCUMENT DATA OBJECTS BASED AT LEAST IN PART ON DEFINED TRIGGER EVENTS

(71) Applicant: UnitedHealth Group Incorporated, Minnetonka, MN (US)

(72) Inventors: Garry Choy, Irvine, CA (US); Rick A. Hamilton, Charlottesville, VA (US); Rafael Campos Do Amaral E Vasconcellos, Plymouth, MN (US); Gregory J. Boss, Saginaw, MI (US); Kerrie L. Holley, San Rafael, CA (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 0 days.

(21) Appl. No.: 17/449,179

(22) Filed: Sep. 28, 2021

(65) Prior Publication Data
US 2022/0292140 A1 Sep. 15, 2022

Related U.S. Application Data

(60) Provisional application No. 63/161,130, filed on Mar. 15, 2021.

(51) Int. Cl.
*G06F 16/93* (2019.01)
*G06F 16/9537* (2019.01)

(52) U.S. Cl.
CPC .......... *G06F 16/93* (2019.01); *G06F 16/9537* (2019.01)

(58) Field of Classification Search
None
See application file for complete search history.

(56) References Cited

U.S. PATENT DOCUMENTS

| 7,813,822 | B1 * | 10/2010 | Hoffberg | H04N 7/163 |
| | | | | 381/73.1 |
| 8,660,856 | B2 | 2/2014 | Lassetter et al. | |
| 9,858,631 | B2 | 1/2018 | Farr et al. | |
| 10,963,625 | B1 * | 3/2021 | Blender | G06F 9/542 |
| 2003/0093298 | A1 | 5/2003 | Hernandez et al. | |

(Continued)

OTHER PUBLICATIONS

"Customized Patient Check-In Software," Phreesia, (12 pages), (online), [Retrieved from the Internet Apr. 19, 2021] <URL: https://www.phreesia.com/products/registration/>.
"Health Insurance Authorization and Compliance Form by Snappii," AppAdvise, (5 pages), (online), [Retrieved from the Internet Oct. 27, 2021] <URL: https://appadvice.com/app/health-insurance-authorization-and-compliance-form/1033243593>.

(Continued)

*Primary Examiner* — Christopher J Raab
(74) *Attorney, Agent, or Firm* — Alston & Bird LLP

(57) ABSTRACT

There is a need to automatically provide one or more electronic documents to the user. In one example, embodiments comprise, generating a facility visit data object for a user describing one or more facility attributes for one or more facilities associated with a potential visit from the user. One or more electronic documents may be determined to be retrieved based at least in part on the facility visit data object. One or more user interaction electronic document data objects may be generated to enable interaction between the user and the one or more electronic document data objects. One or more modified user interaction electronic document data objects may be received and may be provided to one or more facility computing entities in response to one or more trigger events.

20 Claims, 6 Drawing Sheets

(56) References Cited

U.S. PATENT DOCUMENTS

| | | | |
|---|---|---|---|
| 2009/0100323 A1* | 4/2009 | Walls | G06F 16/9558 |
| | | | 715/206 |
| 2014/0316813 A1 | 10/2014 | Bauer | |
| 2016/0070860 A1 | 3/2016 | Saliba et al. | |
| 2016/0328523 A1 | 11/2016 | Bartlett, II et al. | |
| 2017/0329922 A1 | 11/2017 | Eberting et al. | |
| 2018/0082022 A1 | 3/2018 | Francois | |
| 2018/0357249 A1* | 12/2018 | Suzuki | G06F 16/9537 |
| 2019/0164650 A1 | 5/2019 | Schwartz et al. | |
| 2019/0267123 A1 | 8/2019 | Stueckemann et al. | |
| 2019/0295713 A1 | 9/2019 | Sarwari et al. | |
| 2019/0348158 A1 | 11/2019 | Livesay et al. | |
| 2021/0166808 A1* | 6/2021 | Geis | G16H 15/00 |
| 2022/0075831 A1* | 3/2022 | Rout | G06N 5/04 |

OTHER PUBLICATIONS

"Patient Forms—Get Started With Your Treatment," BioPlus Specialty Pharmacy, (3 pages), (online), [Retrieved from the Internet Oct. 27, 2021] <URL: https://www.bioplusrx.com/patients/patient-forms/>.

Huang, Qing et al. "The Impact of Delays to Admission From the Emergency Department on Inpatient Outcomes," BMC Emergency Medicine, vol. 10, No. 2016, pp. 1-6, Dec. 2010.

Symey, Yeo et al. "Application of Smart Technologies for Mobile Patient Appointment System, International Journal of Advanced Trends in Computer Science and Engineering," vol. 2, No. 4, pp. 74-85, Jul.-Aug. 2013, available online at http://warse.org/pdfs/2013/ijatese01242013.pdf, ISSN: 2278-3091.

* cited by examiner

Name: Alex Mourinho
Member ID: 132144325

| Document Name | Status |
|---|---|
| Medical record release authorization | Click to Digitally Sign |
| Liability waiver | Existing Signature Valid |

DYNAMIC DELIVERY OF MODIFIED USER
INTERACTION ELECTRONIC DOCUMENT
DATA OBJECTS BASED AT LEAST IN PART
ON DEFINED TRIGGER EVENTS

CROSS-REFERENCES TO RELATED
APPLICATION(S)

The present application claims priority to U.S. Provisional Patent Application No. 63/161,130 (filed Mar. 15, 2021), which is incorporated herein by reference in its entirety.

BACKGROUND

Various embodiments of the present invention address technical challenges related to automatically providing one or more electronics documents to user computing entities and/or to facility computing entities.

BRIEF SUMMARY

In general, embodiments of the present invention provide methods, apparatuses, systems, computing devices, computing entities, and/or the like for automatically providing one or more electronic documents to user computing entities and/or to facility computing entities.

In accordance with one aspect, a method includes: generating, using one or more processors, a facility visit data object for a user, wherein the facility visit data object describes one or more facility attributes for each facility of one or more facilities which are associated with a potential visit from the user; determining, using the one or more processors, one or more electronic documents to be retrieved based at least in part on the facility visit data object, wherein the one or more electronic documents comprise a per-facility electronic document set associated with each facility that is determined based at least in part on the one or more facility attributes for the facility; at a document retrieval time defined by a document retrieval policy associated with the user, generating, using the one or more processors, one or more user interaction electronic document data objects, wherein the one or more user interaction electronic document data objects enable interaction between the user and the one or more electronic document data objects via a user interface of a user device; receiving, using the one or more processors and from the user device, one or more modified user interaction electronic document data objects, wherein the one or more modified user interaction electronic document data objects are generated based at least in part on the one or more user interaction electronic document data objects as modified by one or more detected interactions between the user and the one or more user interaction electronic document data objects; and providing, using the one or more processors, the one or more modified user interaction electronic document data objects to one or more facility computing entities associated with the one or more facilities in response to one or more trigger events, wherein: (i) the one or more facility computing entities are described by the facility visit data object, and (ii) the one or more facility computing entities are configured to perform one or more automated actions based at least in part on the one or more modified user interaction electronic document data objects.

In accordance with another aspect, an apparatus comprising at least one processor and at least one memory including program code, the at least one memory and the program code configured to, with the processor, cause the apparatus to at least: generate a facility visit data object for a user, wherein the facility visit data object describes one or more facility attributes for each facility of one or more facilities which are associated with a potential visit from the user; determine one or more electronic documents to be retrieved based at least in part on the facility visit data object, wherein the one or more electronic documents comprise a per-facility electronic document set associated with each facility that is determined based at least in part on the one or more facility attributes for the facility; at a document retrieval time defined by a document retrieval policy associated with the user, generate one or more user interaction electronic document data objects, wherein the one or more user interaction electronic document data objects enable interaction between the user and the one or more electronic document data objects via a user interface of a user device; receive, from the user device, one or more modified user interaction electronic document data objects, wherein the one or more modified user interaction electronic document data objects are generated based at least in part on the one or more user interaction electronic document data objects as modified by one or more detected interactions between the user and the one or more user interaction electronic document data objects; and provide the one or more modified user interaction electronic document data objects to one or more facility computing entities associated with the one or more facilities in response to one or more trigger events, wherein: (i) the one or more facility computing entities are described by the facility visit data object, and (ii) the one or more facility computing entities are configured to perform one or more automated actions based at least in part on the one or more modified user interaction electronic document data objects.

In accordance with yet another aspect, a computer program product computer program comprising at least one non-transitory computer-readable storage medium having computer-readable program code portions stored therein, the computer-readable program code portions configured to: generate a facility visit data object for a user, wherein the facility visit data object describes one or more facility attributes for each facility of one or more facilities which are associated with a potential visit from the user; determine one or more electronic documents to be retrieved based at least in part on the facility visit data object, wherein the one or more electronic documents comprise a per-facility electronic document set associated with each facility that is determined based at least in part on the one or more facility attributes for the facility; at a document retrieval time defined by a document retrieval policy associated with the user, generate one or more user interaction electronic document data objects, wherein the one or more user interaction electronic document data objects enable interaction between the user and the one or more electronic document data objects via a user interface of a user device; receive, from the user device, one or more modified user interaction electronic document data objects, wherein the one or more modified user interaction electronic document data objects are generated based at least in part on the one or more user interaction electronic document data objects as modified by one or more detected interactions between the user and the one or more user interaction electronic document data objects; and provide the one or more modified user interaction electronic document data objects to one or more facility computing entities associated with the one or more facilities in response to one or more trigger events, wherein: (i) the one or more facility computing entities are described by the facility visit data object, and (ii) the one or more facility computing entities are configured to perform one or more automated actions based at least in part on the one or more modified user interaction electronic document data objects.

BRIEF DESCRIPTION OF THE DRAWINGS

Figure 1:
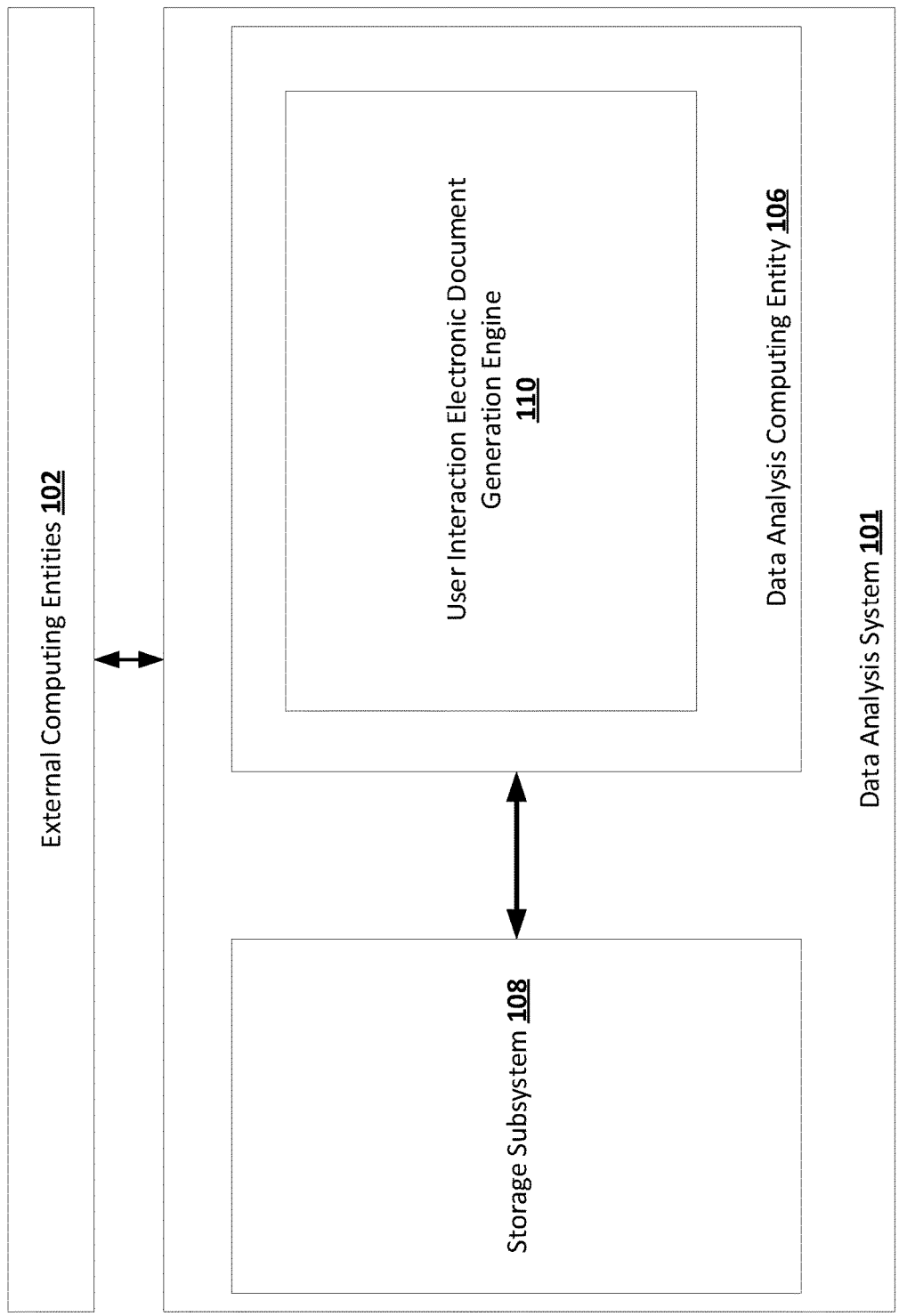
Figure 2:
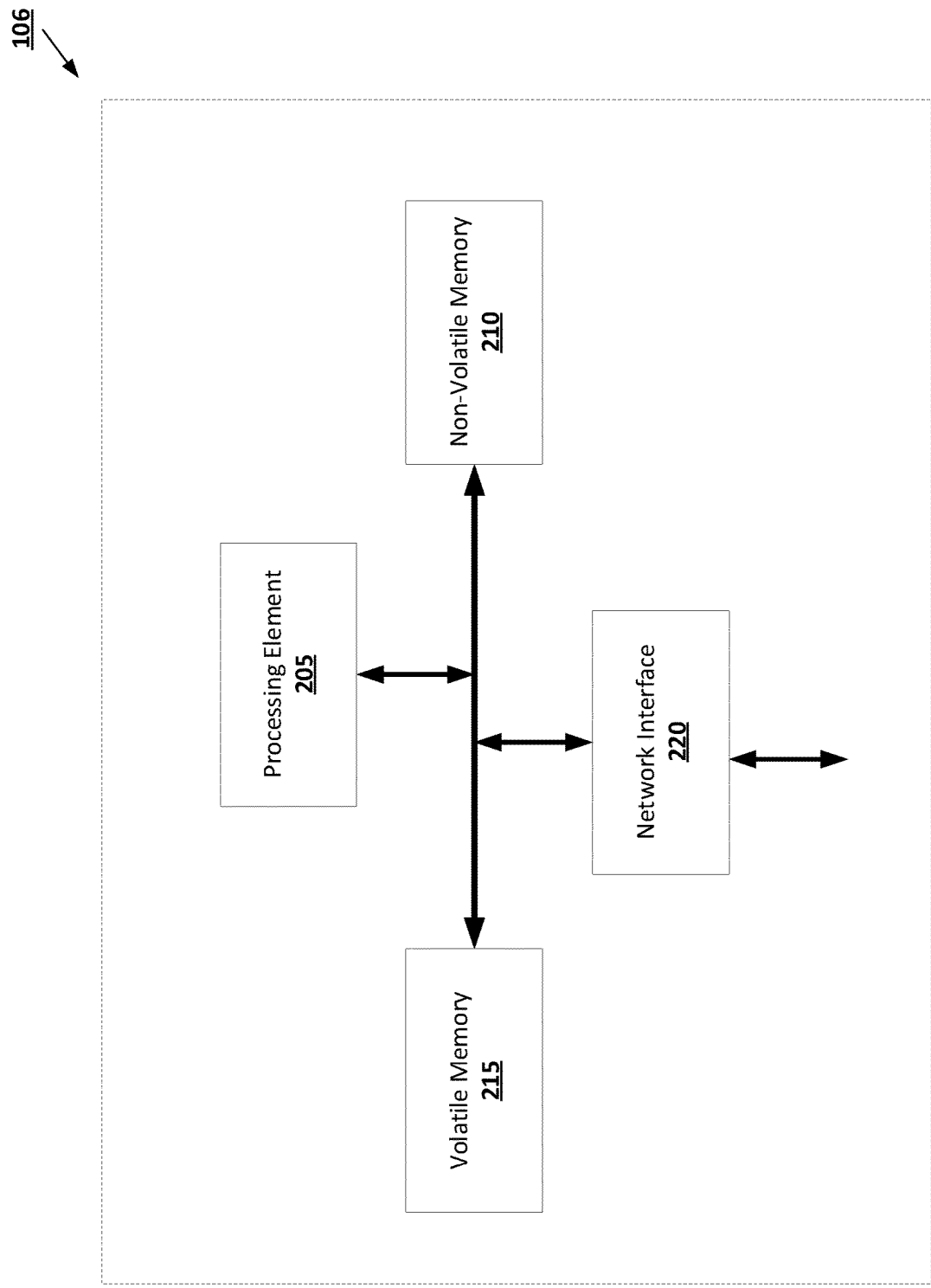
Figure 3:
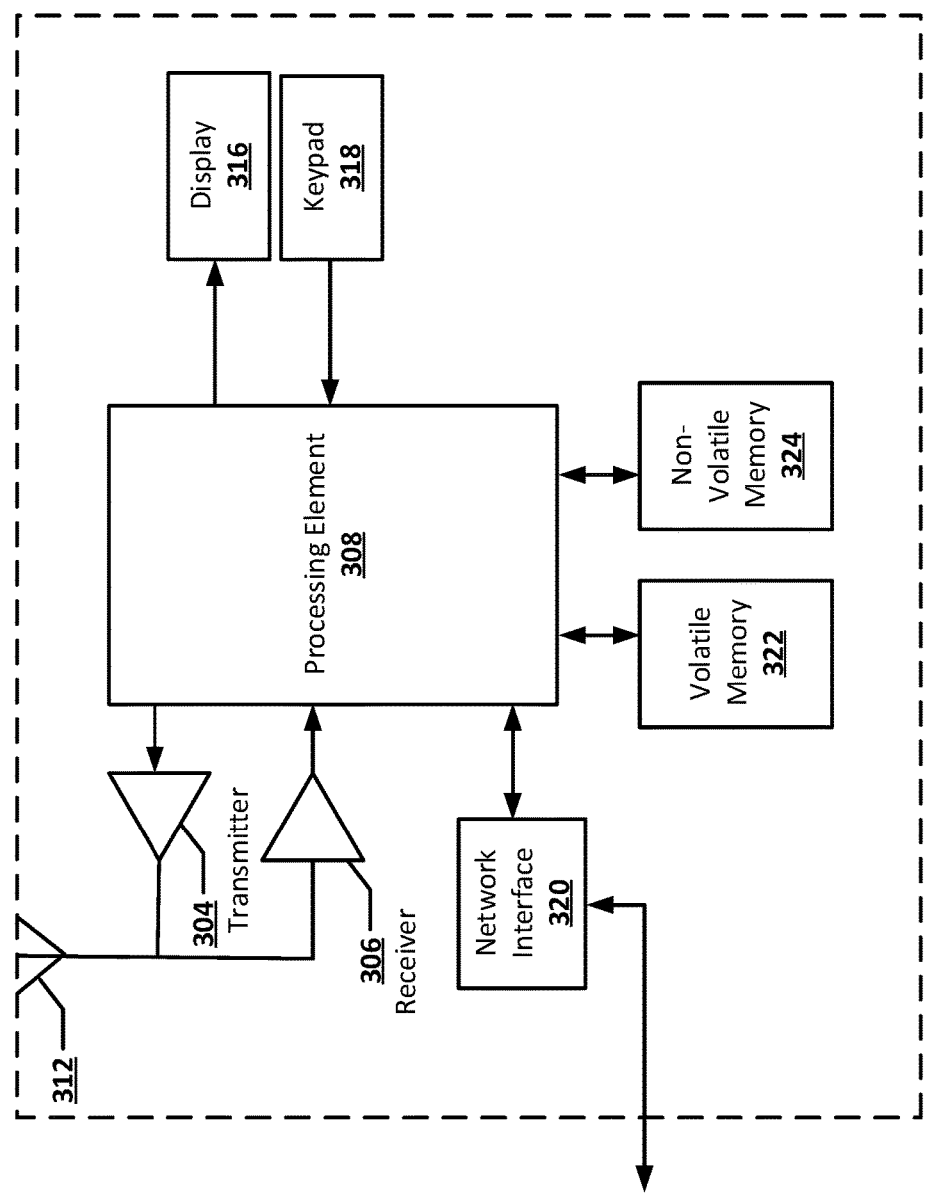
Figure 4:
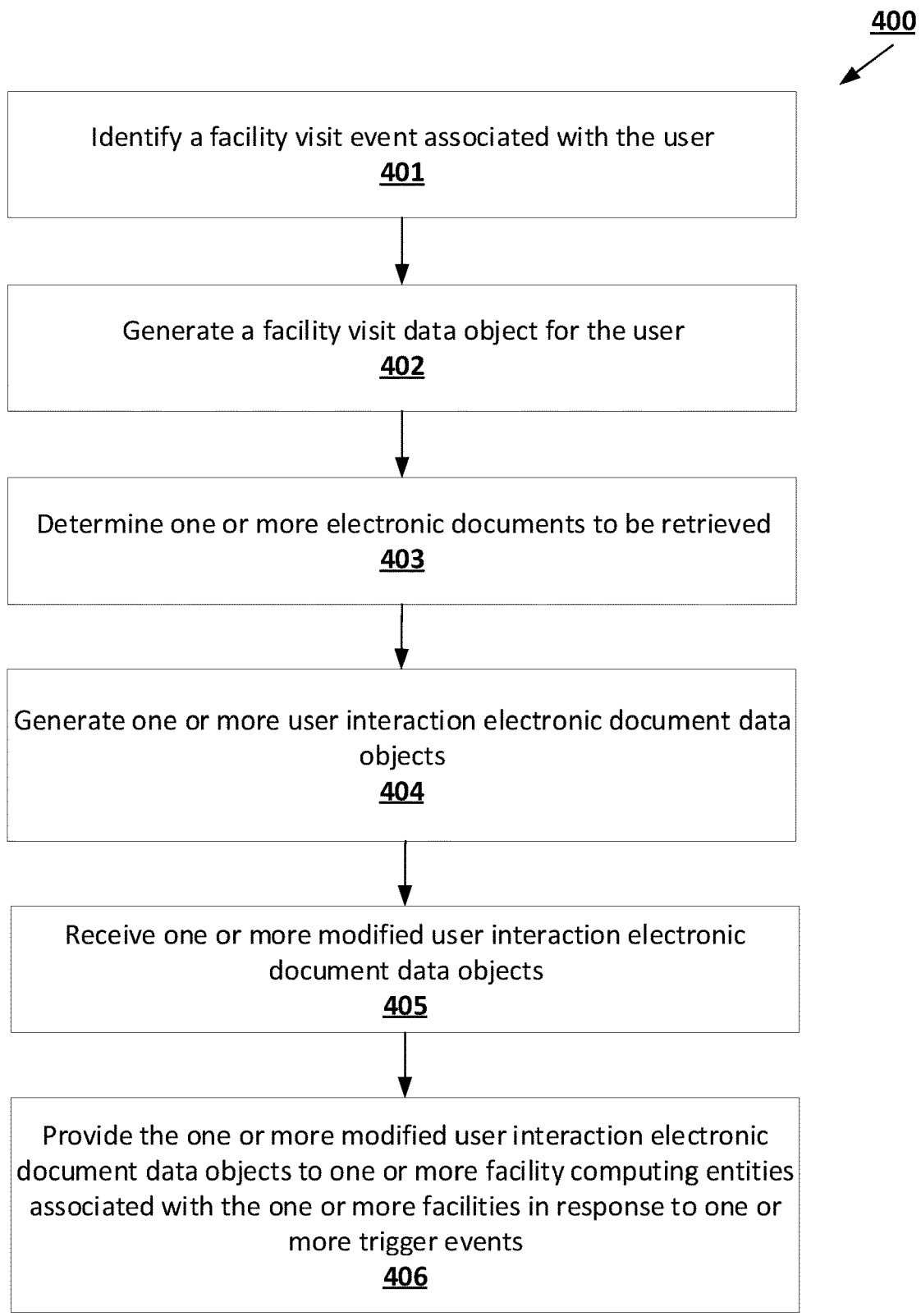
Figure 5:
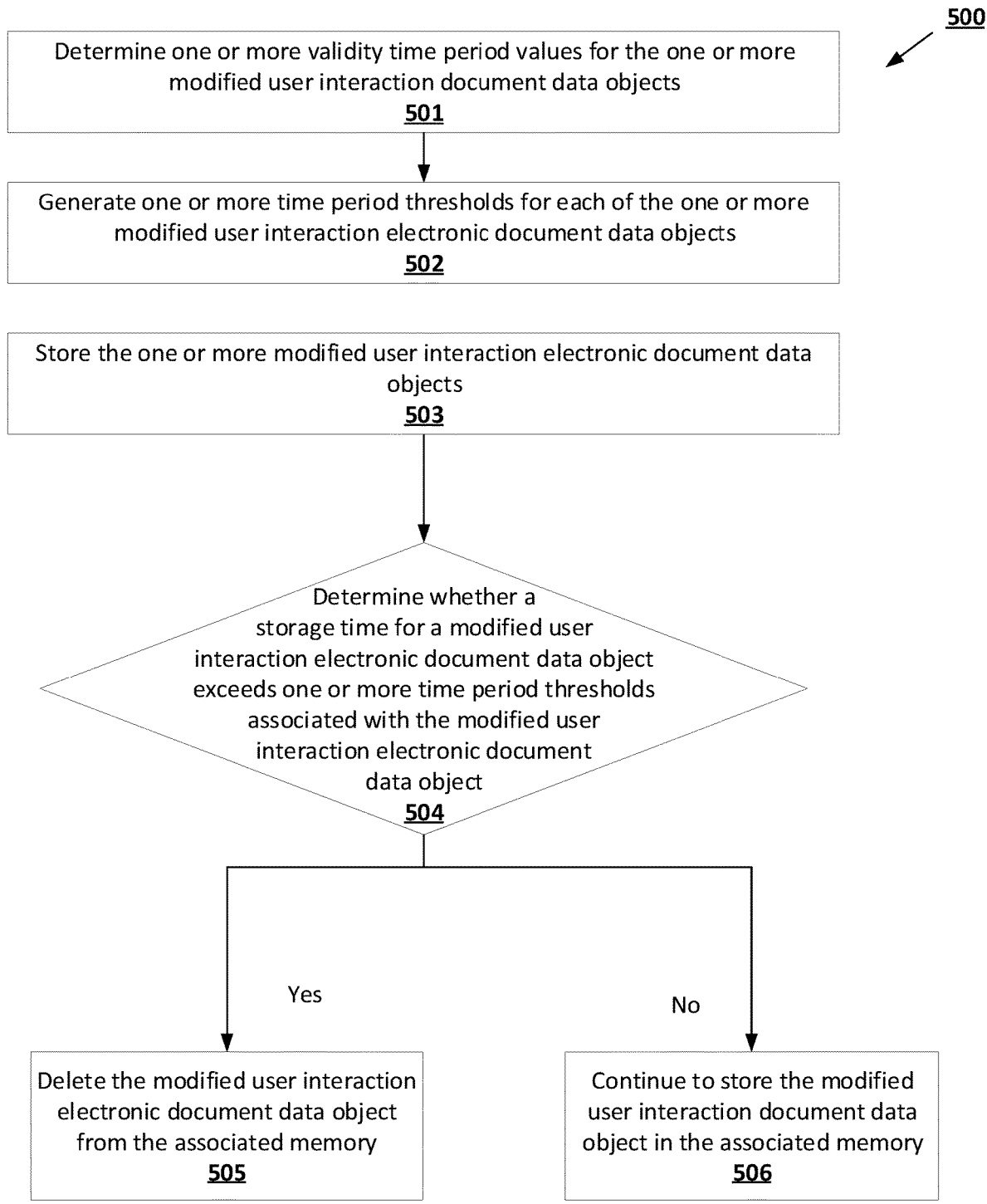

Having thus described the invention in general terms, reference will now be made to the accompanying drawings, which are not necessarily drawn to scale, and wherein:

FIG. 1 provides an exemplary overview of an architecture that can be used to practice embodiments of the present invention;

FIG. 2 provides an example data analysis computing entity in accordance with some embodiments discussed herein;

FIG. 3 provides an example external computing entity in accordance with some embodiments discussed herein;

FIG. 4 is a flowchart diagram of an example process for providing one or more modified user interaction electronic document data objects to one or more facility computing entities in accordance with some embodiments discussed herein;

FIG. 5 is a flowchart diagram of an example process for storing one or more modified user interaction electronic document data objects in accordance with some embodiments discussed herein; and FIG. 6 provides an operational example of a user interface that enables displaying expiration dates for modified user interaction electronic document data objects in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to data analysis, one of ordinary skill in the art will recognize that the disclosed concepts can be used to perform other types of data analysis.

I. Overview and Technical Advantages

Various embodiments of the present invention address technical challenges related to improving network reliability of distributed document retrieval systems by limiting the number of data transmissions between various devices in the distributed document retrieval systems. For example, various embodiments of the present inventions retrieve user interaction electronic document data objects corresponding to electronic documents at a document retrieval time defined by a document retrieval policy associated with a user, where the document retrieval policy may be characterized by at least one of geographic region of a facility visit data object, local laws of a facility visit data object, local provider/insurance retention policies of a facility visit data object, and/or the like. As another example, various embodiments of the present inventions provide one or more modified user interaction electronic document data objects to one or more facility computing entities associated with one or more facilities in response to one or more trigger events. By using the noted techniques, various embodiments of the present invention limit the number of data transmissions between various devices, which in turn makes it less likely that network failures disrupt operational integrity of distributed data retrieval systems, and thus improve network reliability of distributed data retrieval systems, such as distributed document retrieval systems.

Conventionally, documents have been provided to users who visit a particular facility, such as a healthcare facility, when a user physically visits said facility. Some facilities may provide paper documents to the user while others may provide an electronic version of the documents. In some cases, these documents may require interaction by a user, which may then require a user to use a pen, stylus, etc. which another user has interacted with previously. During times of heightened health risks, such as during a pandemic, the user may not feel comfortable interacting with items previously used by another. Further, some facilities may have a short time window available to interact with the documents, such that the user is not provided sufficient time to read the document.

Further complicating matters is the lack of homogeneity in documents amongst facilities, even facilities within the same geographic region. For example, if a facility is a healthcare facility and a user is located in Virginia, the user may visit either a Sentara Martha Jefferson associated facility, or a University of Virginia associated facility. Both types of facilities may require the same document type, such as for example, a HIPAA document, but may each provide their own version such that a HIPAA document associated with a Sentara Martha Jefferson associated facility is not valid at a University of Virginia associated facility.

Various embodiments of the present invention address technical challenges related to automatically providing one or more electronic documents to a user. For example, in some embodiments, proposed solutions disclose generating a facility visit data object for a user, which describes one or more facility attributes of one or more facilities which a user may visit. One or more electronic documents of a per-facility electronic document set which are associated with a facility may be retrieved and one or more user interaction electronic document data objects may be generated to enable interaction between the user and the one or more electronic document data objects. One or more modified user interaction electronic document data objects may be generated based at least in part on one or more detected interactions between the user and the one or more user interaction electronic document data objects. In response to a trigger event, the one or more modified user interaction electronic document data objects may be provided to one or more facility computing entities associated with the one or more facilities described in the facility visit data object. In doing so, various embodiments of the present invention address shortcomings of existing facility document policies and enable solutions that are capable of automatically providing one or more electronic documents to a user. Moreover, various embodiments of the present invention address technical challenges related to improving efficiency, safety, and user-friendliness of healthcare intake processes by improving customer experience, reducing time/nuisance for the user, minimizing potential pathogen exposure of the user, and increasing patient and provider safety.

II. Definitions of Certain Terms

The term "facility visit data object" may refer to an electronically-managed data construct configured to describe one or more attributes for a facility visit event, including one or more facility attributes for each facility of one or more facilities which are associated with a facility visit event (e.g., with a potential visit by a user). In some embodiments, the facility visit data object may be received in response to identifying a facility visit event for the user. In some embodiments, a facility visit data object may include one or more facilities within a facility radius of a user location as indicated by one or more associated user devices. The one or more facility attributes described by the facility visit data object may include a facility name, facility association, facility location, hierarchical facility type designations, facility visit type for the user, and/or the like. A hierarchical facility type designation may describe a relationship between one or more facilities and or facility systems. For example, a particular department in a healthcare facility may be associated with the lowest hierarchical type designation (e.g., emergency department), with the associated healthcare facility as the next highest hierarchical type designation (e.g., University of Virginia University Hospital), the healthcare facility system within a particular location as the next highest hierarchical type designation (e.g., the University of Virginia within Virginia), and the healthcare facility system as a while as the highest hierarchical type designation (e.g., University of Virginia). A facility visit type for the user may be indicative of a reason for the user to potentially visit the facility. In some embodiments, the facility visit type is based at least in part on a facility visit event. For example, a facility visit type may indicate the user is visiting a facility for a routine check-up. As another example, the facility visit type may indicate the user is visiting a facility for an emergency visit. In some embodiments, the one or more attributes may indicate a per-facility electronic document set, which includes one or more electronic documents for a particular facility. In some embodiments, the facility visit data object may describe where the per-facility electronic document set is stored such that the per-facility electronic document set may be retrieved. In some embodiments, the one or more electronic documents associated with a particular visit type may be described by a facility visit data object and based at least in part on a per-visit-type electronic document repository.

The term "facility visit event" may refer to an electronically-managed data construct configured to describe a potential/scheduled facility visit with a particular facility within an event time period for a user. In some embodiments, the facility visit event may be specified by a user. For example, the user may indicate an appointment (i.e., facility visit) with a particular facility at a particular time. In some embodiments, the facility visit event may be determined automatically by accessing one or more external computing entities and/or associated user accounts. For example, a calendar application on a user's mobile device may indicate an appointment (i.e., facility visit) with a particular facility at a particular time. As another example, an input into a global positioning system (GPS), such as directions to a hospital facility, may indicate a facility visit event. The event time period may be determined based at least in part on an estimated time of arrival. In some embodiments, a deviation from a normal route, prescription medications, analysis of electronic health records (EHR), health savings account and/or flexible spending account (HSA/FSA) purchases, and/or the like may also indicate a facility visit event. In some embodiments, a user may be prompted to confirm a facility visit. In some embodiments, a facility visit event may be identified based at least in part on a location of a user as indicated by one or more associated user devices. For example, a facility visit event may include all facilities within a facility radius of a user as indicated by one or more associated user devices. In an instance a user moves geographic locations such that the one or more facilities within the facility radius of the user are no longer accurate, a facility visit event may be identified. While various embodiments of the present invention describe a user interacting with a single user device, a person of ordinary skill in the relevant technology will recognize that a user may interact with two or more user devices (e.g., a smartphone device and a smart tablet device).

The term "electronic document" may refer to an electronically-received data construct configured to describe a collection of content data (e.g., text data) that is associated with a particular facility. In some embodiments, an electronic document is associated with a per-facility electronic document set. The per-facility electronic document set may include one or more electronic documents for a particular facility. For example, a per-facility electronic document set may include all documents associated with the University of Virginia healthcare facility. In some embodiments, the per-facility electronic document set is associated with a particular visit type. For example, a per-facility electronic document set may be associated with an emergency room visit for the University of Virginia healthcare facility. In some embodiments, the per-facility electronic document set is based at least in part on the one or more facility attributes for the particular facility. The electronic document may be retrieved from a particular repository and/or storage system indicated in the facility visit data object. In some embodiments, the per-facility electronic document set is associated with a specific hierarchical facility type designation as described by the facility visit data object. For example, a per-facility electronic document set may be associated with the University of Virginia healthcare facility. As another example, a per-facility electronic document set may be associated with the University of Virginia healthcare facility located in Virginia.

The term "user interaction electronic document data object" may refer to an electronically-managed data construct configured to enable interaction between a user and one or more electronic document data objects. In some embodiments, the user interaction electronic document data object may be determined based at least in part on the one or more retrieved electronic documents. In some embodiments, one or more user interaction electronic document data objects are provided to a user device to enable interaction between the user and the one or more electronic document data objects via a user interface.

The term "modified user interaction electronic document data object" may refer to an electronically-received data construct configured to describe a user interaction electronic document data object as modified by one or more interactions between a user and the one or more modified user interaction electronic document data objects. In some embodiments, the one or more modified user interaction electronic document data objects are determined based at least in part on the one or more user interaction electronic document data objects. In some embodiments, the one or more modified user interaction electronic document data objects are modified based at least in part on one or more detected interactions between the user and the one or more modified user interaction electronic document data objects. In some embodiments, the one or more user interaction electronic document data objects are each associated with a validity time period value. A validity time period value is indicative of a period of time to store the modified user interaction electronic document data object in an associated memory. In some embodiments, one or more time period thresholds for each modified user interaction electronic document data object may be generated based at least in part on the validity time period value. In an instance the storage time for a modified user interaction electronic document data object exceeds the one or more time period thresholds is satisfied, the modified user interaction electronic document data object is deleted from the associated memory. In some embodiments, when a modified user interaction electronic document data object is deleted, a deletion notification may to generated and provided to a user device such that the user may be notified that the modified user interaction electronic document data object has been deleted. In some embodiments, the user interaction electronic document generation engine may generate and/or provide a user with a new user interaction electronic document data object in response to deleting the modified user interaction electronic document data object.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a scripting language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Framework

FIG. 1 is a schematic diagram of an example system architecture 100 for performing data analysis operations related to one or more electronic documents. The system architecture 100 includes a data analysis system 101 comprising a data analysis computing entity 106 configured to provide one or more user interaction electronic document data objects to a user and provide one or more modified user interaction electronic document data objects to one or more facility computing entities. The data analysis system 101 may communicate with one or more external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (e.g., network routers, and/or the like).

The system architecture 100 includes a storage subsystem 108 configured to store at least a portion of the data utilized by the data analysis system 101. The data analysis computing entity 106 may be in communication with one or more external computing entities 102. The data analysis computing entity 106 may be configured to perform one or more operations related to one or more user interaction electronic document data objects and provide one or more modified user interaction electronic document data objects to one or more external computing entities 102. The data analysis computing entity 106 may be configured to receive requests and/or data from external computing entities 102, process the requests and/or data to generate outputs and provide the predictive outputs to the external computing entities 102. The external computing entity 102 may periodically update/provide raw input data (e.g., electronic documents) to the data analysis system 101.

The storage subsystem 108 may be configured to store at least a portion of the data utilized by the data analysis computing entity 106 to perform data analysis steps/operations and tasks. In some embodiments, the storage subsystem 108 stores one or more user interaction electronic document data objects and/or one or more modified user interaction electronic document data objects associated with a user. The storage subsystem 108 may be configured to store at least a portion of operational data and/or operational configuration data including operational instructions and parameters utilized by the data analysis computing entity 106 to perform predictive data analysis steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The data analysis computing entity 106 includes a user interaction electronic document generation engine 110. The user interaction electronic document generation engine 110 may be configured to perform one or more operations relating to one or more documents. For example, the user interaction electronic document generation engine 110 may be configured to retrieve one or more electronic documents, generation one or more user interaction electronic document data objects, receive one or more modified user interaction electronic document data objects, and/or provide one or more modified user interaction electronic document data objects to one or more facility computing entities.

Exemplary Data Analysis Computing Entity

FIG. 2 provides a schematic of a data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the data analysis computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the data analysis computing entity 106 may include or be in communication with a processing element 205 (also referred to as processors, processing circuitry, and/or similar terms used herein interchangeably) that communicate with other elements within the data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the data analysis computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the data analysis computing entity 106 with the assistance of the processing element 205 and operating system.

As indicated, in one embodiment, the data analysis computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the data analysis computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the data analysis computing entity 106 may include or be in communication with one or more input elements, such as a keyboard input, a mouse input, a touch screen/display input, motion input, movement input, audio input, pointing device input, joystick input, keypad input, and/or the like. The data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, wearable devices, computing entities, desktops, mobile phones, tablets, notebooks, laptops, keyboards, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the data analysis computing entity 106 and/or various other computing entities.

In another embodiment, the external computing entity 102 may include one or more components or functionality that are the same or similar to those of the data analysis computing entity 106, as described in greater detail above. As will be recognized, these frameworks and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a video capture device (e.g., camera), a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Framework

As described below, various embodiments of the present invention address technical challenges related to automatically providing one or more electronic documents to a user, and subsequently to a facility computing entity. For example, in some embodiments, proposed solutions disclose generating a facility visit data object for a user describing one or more facility attributes for each facility associated with a potential visit from the user. One or more electronic documents may then be determined to be retrieved based at least in part on the facility visit data object. At a document retrieval time, one or more user interaction electronic document data objects may be generated to enable interaction between the user and the one or more electronic document data objects. One or more modified user interaction electronic document data objects may be received from a user device and provided to one or more facility computing entities in response to a trigger event. In doing so, various embodiments of the present invention address shortcomings of existing methods of providing users and/or facilities with electronic documents. As such, a user may be given sufficient time to review the one or more electronic documents and may interact with electronic documents in a hygienic environment.

FIG. 4 is a flowchart diagram of an example process 400 for providing one or more modified user interaction electronic document data objects to one or more facility computing entities, and subsequently to a facility computing entity. Via the various steps/operations of process 400, the data analysis computing entity 106 may generate a facility visit data object for a user and determine one or more electronic documents to be retrieved. The data analysis computing entity 106 may then generate one or more user interaction electronic document data objects and received one or more modified user interaction electronic document data objects. The data analysis computing entity 106 may provide the one or more modified user interaction electronic document data objects to one or more facility computing entities.

At step/operation 401, the user interaction electronic document generation engine 110 of the data analysis computing entity 106 identifies a facility visit event associated with the user. In some embodiments, the facility visit event is associated with a particular facility within an event time period. In some embodiments, the user interaction electronic document generation engine 110 may generate a confirmation request and provide the confirmation request to a user device such that the user may confirm a facility visit event. In some embodiments, the confirmation request may enable a confirmation, rejection, and/or confirmation with modification user selections. If a user selects a confirmation user selection, the user interaction electronic document generation engine 110 may confirm that the user will visit the facility within the described time period as well as one or more other facility visit event attributes, such as the facility name, location, and/or the like. If a user selects a rejection user selection, the user interaction electronic document generation engine 110 may confirm that the user is not visiting a facility within the event time period. If a user selects a confirmation with modification user selection, the user interaction electronic document generation engine 110 may confirm that the user will visit a facility and also receive one or more modifications regarding the facility visit event. The one or more modifications may modify one or more facility visit event attributes such as a facility name, location, facility visit event time period, etc. such that the facility visit event attributes are accurately reflected for the facility visit event.

The facility visit event may be identified in a variety of ways. The facility visit event may be identified implicitly or explicitly. Identification of explicit facility visit events may be specified by a user. For example, the user may indicate an appointment (i.e., facility visit) with a particular facility at a particular time. As such, the particular facility and event time period may be determined based at least in part on the user provided input. In some embodiments, the facility visit event may be determined via one or more external computing entities 102 and/or one or more associated user accounts. For example, a calendar application on a user's mobile device may indicate an appointment (i.e., facility visit) with a particular facility at a particular time.

Identification of an implicit facility visit event may not be based at least in part on specific facility visit event definition data provided by the user and instead, may rely on the user interaction electronic document generation engine 110 to identify an indication of a facility visit event. For example, a user may provide input directions to a hospital facility, such as by inputting the facility name or associated facility address into an associated navigation system of a user device. As such, the user interaction electronic document generation engine 110 may identify a facility visit event despite lacking direct input from the user. In some embodiments, the event time period may be determined based at least in part on an estimated time of arrival at the facility. In some embodiments, other factors may identify an implicit facility visit event. For example, in some embodiments, a deviation from a normal route for a user, prescription medications, analysis of electronic health records (EHR), health savings account and/or flexible spending account (HSA/FSA) purchases, and/or the like may indicate a facility visit event.

In some embodiments, a facility visit event may be identified based at least in part on a location of a user as indicated by one or more associated user devices. A facility visit event may include all facilities within a facility radius of a user as indicated by one or more associated user devices. For example, a facility visit event may include all healthcare facilities within a 50-mile radius (i.e., facility radius) of the user location as indication by an associated user device may be included in a facility visit event. In an instance where a user moves geographic locations such that the one or more facilities within the facility radius of the user are no longer accurate, a the facility visit event may be updated to describe the healthcare facilities within a 50-mile radius (i.e., facility radius) of the user's new location. In this way, a facility visit event may be updated in real-time to reflect nearby facilities with which a user may visit.

In some embodiments, a user may indicate one or more symptoms associated with the user. The symptoms are then provided to a diagnosis machine learning model that is configured to process the symptoms in order to generate a probabilistic diagnosis vector for the user, where the probabilistic diagnostic vector describes, for each condition of a set of candidate conditions, a likelihood that the user is suffering from the candidate condition. Afterward, the data analysis computing entity 106 may determine one or more medical needs of the user based at least in part on a subset of the set of candidate conditions whose respective probability scores satisfies a probability score threshold. The one or more facilities associated with the facility visit event data object are then determined based at least in part on a set of candidate facilities whose specialty data includes the one or more medical needs.

In some embodiments, if more than one service-eligible facility covers the one or more medical needs, then a medical service quality score is determined for each facility-need pair that describes a likelihood that a corresponding facility will provide quality services in relation to a corresponding medical need as determined based at least in part on historical quality measurement data associated with the corresponding facility. In some of the noted embodiments, for each service-eligible facility, a centroid measure of statistical distribution (e.g., a mean) of medical service quality scores for facility-need pairs that are associated with the service-eligible facility is determined, and then a facility having a highest centroid measure is selected to be assigned to an implicitly-generated facility visit event data object. In some embodiments, the facility visit event time for a facility visit event data object is determined based at least in part on one or more available timeslots of the user and one or more available timeslots of one or more eligible providers in the assigned facility.

At step/operation 402, the user interaction electronic document generation engine 110 of the data analysis computing entity 106 generates a facility visit data object for a user. In some embodiments, the facility visit data object describes one or more facility attributes for each facility of one or more facilities that are associated with a potential visit from the user. In some embodiments, the facility visit data object may be received in response to identifying a facility visit event for the user.

The one or more facility attributes described by the facility visit data object may include a facility name, facility association, facility location, hierarchical facility type designations, facility visit type for the user, and/or the like. A hierarchical facility type designation may describe a relationship between one or more facilities and or facility systems. For example, a particular department in a healthcare facility may be associated with the highest hierarchical type designation (e.g., emergency department), with the associated healthcare facility as the next highest hierarchical type designation (e.g., University of Virginia University Hospital), the healthcare facility system within a particular location as the next highest hierarchical type designation (e.g., the University of Virginia within Virginia), and the healthcare facility system as the highest hierarchical type designation (e.g., University of Virginia). A facility visit type for the user may be indicative of a reason for the user to potentially visit the facility. In some embodiments, the facility visit type is based at least in part on a facility visit event. For example, a facility visit type may indicate the user is visiting a facility for a routine check-up. As another example, the facility visit type may indicate the user is visiting a facility for an emergency visit. In some embodiments, the one or more attributes may indicate a per-facility electronic document set, which includes one or more electronic documents for a particular facility. In some embodiments, the facility visit data object may describe where the per-facility electronic document set is stored such that the per-facility electronic document set may be retrieved. In some embodiments, the one or more electronic documents associated with a particular visit type may be described by a facility visit data object and based at least in part on a per-visit-type electronic document repository.

In some embodiments, a facility visit data object may include one or more facilities within a facility radius of a user location as indicated by one or more associated user devices. In some embodiments, the one or more facilities within a facility radius of the user may be described by the facility visit event. For example, all healthcare facilities within a 50-mile radius (i.e., facility radius) of the user location as indication by an associated user device may be included in a facility visit data object.

In some embodiments, identify facilities that are within a facility radius of a user location comprises: (i) identifying a user location, and (ii) determining an optimal facility radius for the user. In some embodiments, to identify the user location, the data analysis computing entity 106: (i) determines whether user's association with a current detected location of the user is temporary or permanent, (ii) if the user's association with a current detected location of the user is temporary, identifies the user location as an existing permanent user location for the user, and (iii) if the user's association with a current detected location of the user is permanent, updates the existing permanent user location for the user to describe the current detected location and identifies the user location as the updated existing permanent user location for the user.

In some embodiments, to determine whether user's association with a current detected location of the user is temporary or permanent, the data analysis computing entity 106 compares: (i) a variance of locations of the user that are recorded within a defined time window (e.g., a two week time window) whose midpoint is the first detection of the user in current detected location of the user, and (ii) a variance of locations of the user that are recorded within a defined time window (e.g., a two week time window) whose midpoint is the first detection of the user in the existing permanent user location for the user (where during a first iteration of the program the existing permanent user location for the user may be set to a user-selected location or a user-defined home location). In some embodiments, if a measure of deviation of the two variances satisfies a threshold, then the user's association with a current detected location of the user is temporary, while if the measure of deviation fails to satisfy the threshold, then the user's association with a current detected location of the user is permanent. In some embodiments, the optimal facility radius for a user is determined based at least in part on data about mobility capability of the user, data about health conditions of the user that defines a maximum travel capability for the user, data about public transportation availability in a region of the user location, data about traffic conditions of the noted region, and/or the like. In some embodiments, the optimal facility for a user is determined based at least in part on detecting a range of travel distances for the user within a recent defined time window (e.g., a two week time window), detecting a centroid (e.g., a mean) measure for the range, and determining the optimal facility radius based at least in part on the centroid measure. In some embodiments, the optimal facility for a user is determined based at least in part on detecting a range of travel distances for the user within a recent defined time window (e.g., a two week time window) that satisfies one or more traffic condition requirements (e.g., that occur under similar traffic conditions to existing traffic conditions), detecting a centroid (e.g., a mean) measure for the range, and determining the optimal facility radius based at least in part on the centroid measure.

At step/operation 403, the user interaction electronic document generation engine 110 of the data analysis computing entity 106 determines one or more electronic documents to be retrieved. In some embodiments, the user interaction electronic document generation engine 110 determines the one or more electronic documents to be retrieved based at least in part on the facility visit data object. The one or more electronic documents may include a per-facility electronic set associated with each facility determined based at least in part on the one or more facility attributes for the facility. For example, a per-facility electronic document set may include all documents associated with the University of Virginia healthcare facility. The electronic document may be retrieved from a particular repository and/or storage system indicated in the facility visit data object.

In some embodiments, the per-facility electronic document set is based at least in part on the one or more facility attributes for the particular facility. In some embodiments, the per-facility electronic document set is associated with a particular visit type as described by the facility visit data object. For example, a per-facility electronic document set may be associated with an emergency room visit for the University of Virginia healthcare facility. In some embodiments, the per-facility electronic document set is associated with a specific hierarchical facility type designation as described by the facility visit data object. For example, a per-facility electronic document set may be associated with the University of Virginia healthcare facility. As another example, a per-facility electronic document set may be associated with the University of Virginia healthcare facility located in Virginia. In this way, only relevant electronic documents may be retrieved, thus reducing network bandwidth usage associated with retrieving the electronic documents as well resulting in more efficient storage usage.

At step/operation 404, the user interaction electronic document generation engine 110 of the data analysis computing entity 106 generates one or more user interaction electronic document data objects. In some embodiments, the user interaction electronic document generation engine 110 generates the one or more user interaction electronic document data objects at a document retrieval time defined by a document retrieval policy associated with the user. In some embodiments, the user interaction electronic document data object may be determined based at least in part on the one or more retrieved electronic documents. A document retrieval policy associated with the user may describe a time period to retrieve the one or more user interaction electronic document data objects with a user device associated with a user. In some embodiments, the document retrieval policy may be determined based at least in part on an associated event time period. For example, a document retrieval policy may describe a document retrieval time of four hours before an event time period. As another example, a document retrieval policy may describe a document retrieval time of user confirmation, where the user interaction electronic document generation engine 110 will not generate one or more user interaction electronic document data objects until user confirmation is received to do so.

In some embodiments, the document retrieval policy may be determined based at least in part on facility visit data object and/or the one or more electronic document data objects. In some embodiments, the one or more electronic documents for a particular facility may be required to be interacted with by a user within a particular time period from the event time period. This time period may be described in the facility visit data object. For example, a first electronic document may have an associated document retrieval time of 12 hours before an event time period and a second electronic document may have an associated document retrieval time of 6 hours before the event time period. In some embodiments, the two or more user interaction data objects may correspond to the same facility but have different associated document retrieval times. In some embodiments, the document retrieval policy may be defined such that one or more user interaction electronic document data objects which are determined based at least in part on two or more electronic documents associated with a per-facility electronic document set may be generated based at least in part on the electronic document with the smallest associated document retrieval time. As such, the user may consolidate the number of times the one or more user interaction electronic document data objects are generated.

In some embodiments, the document retrieval time is selected as a time that is likely to maximize the likelihood of user interaction with the one or more user interaction electronic document data objects. For example, in some embodiments, the data analysis computing entity 106 may be configured to define, for each time period of a set of candidate time periods, a likelihood that the user interacts with one or more electronic devices of the user during the time period based at least in part on past user interaction data describing a total user interaction time of the user with the one or more electronic devices during time periods having features that are similar to the target time period (e.g., if the time period is in the 3:00-4:00 PM slot, then during past time periods having that time slot). In some embodiments, the data retrieval time may be selected based at least in part on the likelihood measures. For example, the document retrieval time may be selected from a set of eligible time periods that satisfy requirements of the document retrieval policy by selecting the eligible time period having the highest likelihood measure among the eligible time periods. In some embodiments, the electronic device to which the one or more user interaction electronic document data objects are delivered may also be determined based at least in part on an electronic device having the highest total interaction time during the selected document retrieval time.

In some embodiments, the one or more user interaction electronic document data objects enable interaction between the user and the one or more electronic document data objects via a user interface of a user device. In some embodiments, one or more interaction areas configured for the interaction between the user and the one or more user interaction electronic document data objects may be defined within the one or more user interaction electronic document data objects. In some embodiments, the one or more interaction areas may be indicated to the user such that the user is able to discern where the one or more interaction areas are relative to the one or more user interaction electronic document data objects.

At step/operation 405, the user interaction electronic document generation engine 110 of the data analysis computing entity 106 receives one or more modified user interaction electronic document data objects. In some embodiments, the one or more modified user interaction electronic document data objects are generated based at least in part on the one or more user interaction electronic document data objects as modified by one or more detected interactions between the user and the one or more user interaction electronic document data objects. The one or more received modified user interaction electronic document data objects may be stored in an associated memory, such as storage subsystem 108.

In some embodiments, by using the techniques of step/operation 405, various embodiments of the present inventions provide one or more modified user interaction electronic document data objects to one or more facility computing entities associated with one or more facilities in response to one or more trigger events. By using the noted techniques, various embodiments of the present invention limit the number of data transmissions between various devices, which in turn makes it less likely that network failures disrupt operational integrity of distributed data retrieval systems, and thus improve network reliability of distributed data retrieval systems, such as distributed document retrieval systems.

In some embodiments, step/operation 405 may be performed in accordance with the various steps/operations of the process 500 depicted in FIG. 5, which is a flowchart diagram of an example process for storing one or more modified user interaction electronic document data objects.

At step/operation 501, the user interaction electronic document generation engine 110 of the data analysis computing entity 106 determines one or more validity time period values for the one or more modified user interaction document data objects. In some embodiments each validity time period value corresponds to a particular modified user interaction electronic document data object. The validity time period may be determined for each modified user interaction document data object based at least in part on the one or more facility visit data objects. In some embodiments, a validity time period value is indicative of a period of time to store the modified user interaction electronic document data object in an associated memory. In some embodiments, one or more time period thresholds may cause the user interaction electronic document generation engine 110 to generate a time period notification for the user, indicating the validity time period for each modified user interaction document data object.

At step/operation 502, the user interaction electronic document generation engine 110 of the data analysis computing entity 106 generates one or more time period thresholds for each of the one or more modified user interaction electronic document data objects. In some embodiments, the one or more time period thresholds are determined based at least in part on the validity time period value associated with the corresponding modified user interaction electronic document data object. In some embodiments, each time period threshold describes a timestamp for recommended storage of a corresponding modified user interaction electronic document data object in an associated memory. In some embodiments, a modified user interaction electronic document data object may be associated with two or more time period thresholds, each describing a timestamp for recommended storage of a version of two or more versions of a corresponding modified user interaction electronic document data object in an associated memory.

At step/operations 503, the user interaction electronic document generation engine 110 of the data analysis computing entity 106 stores the one or more modified user interaction electronic document data objects in an associated memory, such as storage subsystem 108. When the user interaction electronic document generation engine 110 stores the one or more modified user interaction electronic document data object, the user interaction electronic document generation engine 110 may begin a time indicative of the storage time for each of the one or more user interaction electronic document data objects.

At step/operation 504, the user interaction electronic document generation engine 110 of the data analysis computing entity 106 determines whether a storage time for a modified user interaction electronic document of the one or more modified user interaction electronic documents exceeds one or more time period thresholds associated with the modified user interaction electronic document data object. The user interaction electronic document generation engine 110 of the data analysis computing entity 106 may repeat this step/operation for each modified user interaction electronic document of the one or more modified user interaction electronic documents. In some embodiments, the user interaction electronic document generation engine 110 may periodically perform this step/operation, such as every hour, daily, and/or the like.

In an instance the storage time for a modified user interaction electronic document exceeds one or more time period thresholds associated with the modified user interaction electronic document data object, the user interaction electronic document generation engine 110 proceeds to step/operation 505. At step/operation 505, the user interaction electronic document generation engine 110 of the data analysis computing entity 106 deletes the modified user interaction electronic document data object for the associated memory. In some embodiments, the user interaction electronic document generation engine 110 may generate a deletion notification to send to a user device such that the user may be notified that the modified user interaction electronic document data object has been deleted. In some embodiments, the user interaction electronic document generation engine 110 may generate and/or provide a user with a new user interaction electronic document data object.

In an instance the storage time for a modified user interaction electronic document does not exceed one or more time period thresholds associated with the modified user interaction electronic document data object, the user interaction electronic document generation engine 110 proceeds to step/operation 506. At step/operation 506, the user interaction electronic document generation engine 110 of the data analysis computing entity 106 continues to store the modified user interaction document data object in the associated memory.

At step/operation 406, the user interaction electronic document generation engine 110 of the data analysis computing entity 106 provides the one or more modified user interaction electronic document data objects to one or more facility computing entities associated with the one or more facilities in response to one or more trigger events. In some embodiments, the one or more facility computing entities are described by the facility visit data object. In some embodiments, the one or more facility computing entities are configured to perform one or more automated actions based at least in part on the one or more modified user interaction electronic document data objects.

In some embodiments, the set of automated actions that may be performed by the facility computing entities include displaying a user interface that enables displaying expiration dates for modified user interaction electronic document data objects that are determined based at least in part on storage times for the modified user interaction electronic document data objects in relation to time period thresholds for the modified user interaction electronic document data objects, as well as resending the modified user interaction electronic document data objects for obtaining user signature.

In some embodiments, the data analysis computing entity 106 is configured to perform one or more prediction-based actions in relation to user interaction electronic document data objects and/or modified user interaction electronic document data objects. For example, the data analysis computing entity 106 may be configured to generate user interface data for a user interface, where one or more user computing devices may be configured to present the user interface based at least in part on the user interface data. An operational example of such a user interface 600 is depicted in FIG. 6. As depicted in FIG. 6, the user interface 600 enables digitally signing user interaction electronic document data objects and viewing that modified user interaction electronic document data objects with non-expired signatures have an existing valid signature.

In some embodiments, a triggering event is associated with a particular facility. In some embodiments, the triggering event for a particular facility is determined when a wireless personal area network connection (e.g., a near-field communication (NFC) connection, a Bluetooth connection, a Bluetooth Low Energy (BLE) connection, a Radio Frequency ID (RFID) connection, an Ultra Wide Band (UWB) connection, and/or the like) has been established between the user device and a receiving device associated with the particular facility. For example, a facility may have an NFC capable device nearby a facility entrance. A user may place his/her associated user device nearby the NFC capable device and cause a triggering event. In some, upon establishment of the NFC communications between the facility NFC capable device and the associated user device, the modified interaction electronic document generation engine 110 may provide one or more facilities associated with the facility NFC capable device with one or more modified user interaction electronic document data objects.

In some embodiments, a triggering event is associated with receiving authorization from the user to provide the one or more modified user interaction electronic document data objects to the one or more facility computing entities. In some embodiments, the user may select one or more facilities with which to provide the modified one or more modified user interaction electronic document data objects to. In some embodiments, a user may directly provide authorization to provide the one or more user modified interaction electronic document data objects to one or more facility computing entities. Upon receiving user authorization, the modified interaction electronic document generation engine 110 may provide one or more healthcare facility computing entities with the one or more modified user interaction electronic document data objects.

In some embodiments, a triggering event is determined based at least in part on an estimated arrival time of a user to the facility, e.g., is determined to be prior to the arrival time. In some embodiments, the estimated arrival time of the user is determined based at least in part on an average current speed of the user during a time window (e.g., a thirty minute time window) before the facility event time of the facility visit data object and a distance between the user location and the facility location of the facility visit data object In some embodiments, the triggering event is determined in a manner that is configured to ensure that the one or more modified user interaction electronic document data objects are preloaded on the facility computing entities prior to an estimated/detected/sensed user arrival. In some embodiments, incoming modified user interaction electronic document data objects to the facility computing entities are queued based at least in part on receipt time of the incoming modified user interaction electronic document data objects by the facility computing entities, and the triggering event for a particular modified user interaction electronic document data object is a time when the modified user interaction electronic document data object reaches a top of the queue.

Accordingly, using the above-described techniques, various embodiments of the present invention address technical challenges related to automatically providing one or more electronic documents to a user. For example, in some embodiments, proposed solutions disclose generating a facility visit data object for a user describing one or more facility attributes for each facility associated with a potential visit from the user. One or more electronic documents associated with each facility may be determined and retrieved and one or more user interaction electronic document data objects may be generated to enable interaction between the user and the one or more electronic document data objects. The one or more electronic documents may be provided to one or more facility computing entities in response to one or more trigger events. As such, a user may learn more efficiently and have an overall more positive experience during a user interaction session with the computer system. In doing so, various embodiments of the present invention address shortcomings of existing methods of providing documents to a user visiting a facility, such as by allotting a user sufficient time to review the one or more electronic documents and allowing the user to interact with electronic documents in a hygienic environment.

As described above, various embodiments of the present invention address technical challenges related to improving network reliability of distributed document retrieval systems by limiting the number of data transmissions between various devices in the distributed document retrieval systems. For example, various embodiments of the present inventions retrieve user interaction electronic document data objects corresponding to electronic documents at a document retrieval time defined by a document retrieval policy associated with a user. As another example, various embodiments of the present inventions provide one or more modified user interaction electronic document data objects to one or more facility computing entities associated with one or more facilities in response to one or more trigger events. By using the noted techniques, various embodiments of the present invention limit the number of data transmissions between various devices, which in turn makes it less likely that network failures disrupt operational integrity of distributed data retrieval systems, and thus improve network reliability of distributed data retrieval systems, such as distributed document retrieval systems.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A computer-implemented method for automatically providing one or more electronic documents to a user, the computer-implemented method comprising:
   generating, using one or more processors, a facility visit data object for a user, wherein the facility visit data object describes one or more facility attributes for each facility of one or more facilities which are associated with a potential visit from the user;
   determining, using the one or more processors, one or more electronic documents to be retrieved based at least in part on the facility visit data object, wherein the one or more electronic documents comprise a per-facility electronic document set associated with each facility that is determined based at least in part on the one or more facility attributes for the facility;
   at a document retrieval time defined by a document retrieval policy associated with the user, generating, using the one or more processors, one or more user interaction electronic document data objects, wherein the one or more user interaction electronic document data objects enable interaction between the user and the one or more electronic document data objects via a user interface of a user device;
   receiving, using the one or more processors and from the user device, one or more modified user interaction electronic document data objects, wherein the one or more modified user interaction electronic document data objects are generated based at least in part on the one or more user interaction electronic document data objects as modified by one or more detected interactions between the user and the one or more user interaction electronic document data objects; and
   providing, using the one or more processors, the one or more modified user interaction electronic document data objects to one or more facility computing entities associated with the one or more facilities in response to one or more trigger events, wherein: (i) the one or more facility computing entities are described by the facility visit data object, and (ii) the one or more facility computing entities are configured to perform one or more automated actions based at least in part on the one or more modified user interaction electronic document data objects.

2. The computer-implemented method of claim 1, further comprising:
   identifying, using the one or more processors, a facility visit event associated with the user, wherein the facility visit event is associated with a particular facility within an event time period, and
   wherein identifying the facility visit event triggers the determination to generate the facility visit data object.

3. The computer-implemented method of claim 1, further comprising:
   determining, using the one or more processors, one or more validity time period values for the one or more modified user interaction electronic document data objects, wherein each validity time period value corresponds to a particular modified user interaction electronic document data object, and wherein each validity time period value is indicative of a period of time to store the modified user interaction electronic document data object in an associated memory.

4. The computer-implemented method of claim 3, further comprising:
   generating, using the one or more processors, one or more time period thresholds for each of the one or more modified user interaction electronic document data objects based at least in part on the validity time period value associated with the corresponding modified user interaction electronic document data object; and
   storing the one or more modified user interaction electronic document data objects in the associated memory; and
   determining, using the one or more processors, whether a storage time for each of the stored one or more modified user interaction electronic document data objects exceeds the one or more time period thresholds associated with the modified user interaction electronic document data object; and
   in an instance where the storage time for one of the one or more stored modified user interaction electronic document data objects exceeds the one or more time period thresholds associated with the modified user interaction electronic document data object, deleting the modified user interaction electronic document data object from the associated memory.

5. The computer-implemented method of claim 1, wherein the one or more facilities associated with the potential visit from the user are determined based at least in part on a location of the user as indicated by the user device.

6. The computer-implemented method of claim 1, wherein:
   the one or more attributes of the facility visit data object describe a facility visit type indicative of a reason for the user to potentially visit the facility, and
   the per-facility electronic document set associated with each of the one or more facilities described by the facility visit data object is determined based at least in part on a per-visit-type electronic document repository associated with the facility visit type.

7. The computer-implemented method of claim 1, wherein:
   each triggering event is associated with the facility; and
   the triggering event for a particular facility comprises a determination that a wireless personal area network connection has been established between the user device and a receiving device associated with the particular facility.

8. The computer-implemented method of claim 1, wherein the one or more trigger events comprises receiving authorization from the user to provide the one or more modified user interaction electronic document data objects to the one or more facility computing entities.

9. The computer-implemented method of claim 1, wherein:
   the one or more facility attributes for a particular facility comprise a plurality of hierarchical facility type designations for the particular facility, and
   the per-facility electronic document set for the particular facility comprise, for each hierarchical facility type designation, an electronic document repository for the hierarchical facility type designation.

10. An apparatus for automatically providing one or more electronic documents to a user, the apparatus comprising at least one processor and at least one memory including program code, the at least one memory and the program code configured to, with the processor, cause the apparatus to at least:
    generate a facility visit data object for a user, wherein the facility visit data object describes one or more facility attributes for each facility of one or more facilities which are associated with a potential visit from the user;

determine one or more electronic documents to be retrieved based at least in part on the facility visit data object, wherein the one or more electronic documents comprise a per-facility electronic document set associated with each facility that is determined based at least in part on the one or more facility attributes for the facility;

at a document retrieval time defined by a document retrieval policy associated with the user, generate one or more user interaction electronic document data objects, wherein the one or more user interaction electronic document data objects enable interaction between the user and the one or more electronic document data objects via a user interface of a user device;

receive, from the user device, one or more modified user interaction electronic document data objects, wherein the one or more modified user interaction electronic document data objects are generated based at least in part on the one or more user interaction electronic document data objects as modified by one or more detected interactions between the user and the one or more user interaction electronic document data objects; and provide the one or more modified user interaction electronic document data objects to one or more facility computing entities associated with the one or more facilities in response to one or more trigger events, wherein: (i) the one or more facility computing entities are described by the facility visit data object, and (ii) the one or more facility computing entities are configured to perform one or more automated actions based at least in part on the one or more modified user interaction electronic document data objects.

11. The apparatus of claim 10, wherein the at least one memory and the program code configured to, with the processor, cause the apparatus to further:
identify a facility visit event associated with the user, wherein the facility visit event is associated with a particular facility within an event time period, and wherein identifying the facility visit event triggers the determination to generate the facility visit data object.

12. The apparatus of claim 10, wherein the at least one memory and the program code configured to, with the processor, cause the apparatus to further:
determine one or more validity time period values for the one or more modified user interaction electronic document data objects, wherein each validity time period value corresponds to a particular modified user interaction electronic document data object, and wherein each validity time period value is indicative of a period of time to store the modified user interaction electronic document data object in an associated memory.

13. The apparatus of claim 12, wherein the at least one memory and the program code configured to, with the processor, cause the apparatus to further:
generate one or more time period thresholds for each of the one or more modified user interaction electronic document data objects based at least in part on the validity time period value associated with the corresponding modified user interaction electronic document data object; and
store the one or more modified user interaction electronic document data objects in the associated memory; and
determine whether a storage time for each of the stored one or more modified user interaction electronic document data objects exceeds the one or more time period thresholds associated with the modified user interaction electronic document data object; and
in an instance where the storage time for one of the one or more stored modified user interaction electronic document data objects exceeds the one or more time period thresholds associated with the modified user interaction electronic document data object, delete the modified user interaction electronic document data object from the associated memory.

14. The apparatus of claim 10, wherein the one or more facilities associated with the potential visit from the user are determined based at least in part on a location of the user as indicated by the user device.

15. The apparatus of claim 10, wherein:
the one or more attributes of the facility visit data object describe a facility visit type indicative of a reason for the user to potentially visit the facility, and
the per-facility electronic document set associated with each of the one or more facilities described by the facility visit data object are determined based at least in part on a per-visit-type electronic document repository associated with the facility visit type.

16. The apparatus of claim 10, wherein:
each triggering event is associated with the facility; and
the triggering event for a particular facility comprises a determination that wireless personal area network connection has been established between the user device and a receiving device associated with the particular facility.

17. The apparatus of claim 10, wherein the one or more trigger events comprises receiving authorization from the user to provide the one or more modified user interaction electronic document data objects to the one or more facility computing entities.

18. The apparatus of claim 10, wherein:
the one or more facility attributes for a particular facility comprise a plurality of hierarchical facility type designations for the particular facility, and
the per-facility electronic document set for the particular facility comprise, for each hierarchical facility type designation, an electronic document repository for the hierarchical facility type designation.

19. A computer program product for automatically providing one or more electronic documents to a user, the computer program product comprising at least one non-transitory computer-readable storage medium having computer-readable program code portions stored therein, the computer-readable program code portions configured to:
generate a facility visit data object for a user, wherein the facility visit data object describes one or more facility attributes for each facility of one or more facilities which are associated with a potential visit from the user;
determine one or more electronic documents to be retrieved based at least in part on the facility visit data object, wherein the one or more electronic documents comprise a per-facility electronic document set associated with each facility that is determined based at least in part on the one or more facility attributes for the facility;
at a document retrieval time defined by a document retrieval policy associated with the user, generate one or more user interaction electronic document data objects, wherein the one or more user interaction electronic document data objects enable interaction between the user and the one or more electronic document data objects via a user interface of a user device;

receive, from the user device, one or more modified user interaction electronic document data objects, wherein the one or more modified user interaction electronic document data objects are generated based at least in part on the one or more user interaction electronic document data objects as modified by one or more detected interactions between the user and the one or more user interaction electronic document data objects; and provide the one or more modified user interaction electronic document data objects to one or more facility computing entities associated with the one or more facilities in response to one or more trigger events, wherein: (i) the one or more facility computing entities are described by the facility visit data object, and (ii) the one or more facility computing entities are configured to perform one or more automated actions based at least in part on the one or more modified user interaction electronic document data objects.

20. The computer program product of claim 19, wherein the computer-readable program code portions are further configured to identify a facility visit event associated with the user, wherein the facility visit event is associated with a particular facility within an event time period, and wherein identifying the facility visit event triggers the determination to generate the facility visit data object.

* * * * *